US012430511B2

(12) United States Patent
Prasad et al.

(10) Patent No.: US 12,430,511 B2
(45) Date of Patent: Sep. 30, 2025

(54) GENERATING SUGGESTED INSTRUCTIONS THROUGH NATURAL LANGUAGE PROCESSING OF INSTRUCTION EXAMPLES

(71) Applicant: Maplebear Inc., San Francisco, CA (US)

(72) Inventors: Shishir Kumar Prasad, Fremont, CA (US); Cameron Nicholas Taylor, Walnut Creek, CA (US); John Salaveria, San Francisco, CA (US); Joey Loi, Brooklyn, NY (US); Kevin McCullough, San Antonio, TX (US)

(73) Assignee: Maplebear Inc., San Francisco, CA (US)

( * ) Notice: Subject to any disclaimer, the term of this patent is extended or adjusted under 35 U.S.C. 154(b) by 486 days.

(21) Appl. No.: 17/821,889

(22) Filed: Aug. 24, 2022

(65) Prior Publication Data
US 2024/0070393 A1    Feb. 29, 2024

(51) Int. Cl.
    *G06F 17/00*     (2019.01)
    *G06F 40/20*     (2020.01)
    (Continued)

(52) U.S. Cl.
    CPC ............ *G06F 40/284* (2020.01); *G06F 40/20* (2020.01); *G06Q 30/0613* (2013.01);
    (Continued)

(58) Field of Classification Search
    CPC ........ G06Q 30/00; G06Q 30/01; G06Q 30/06; G06Q 30/0601; G06Q 30/0621;
    (Continued)

(56) References Cited

U.S. PATENT DOCUMENTS 9,672,555 B1 *   6/2017   Dillard .................... G06F 16/35
2010/0138377 A1 *   6/2010   Wright .................... G06N 5/01
                                                  706/52

(Continued)

OTHER PUBLICATIONS

PCT International Search Report and Written Opinion, PCT Application No. PCT/US22/50283, Feb. 21, 2023, 8 pages.

*Primary Examiner* — Michael Ortiz-Sanchez
(74) *Attorney, Agent, or Firm* — Fenwick & West LLP

(57) ABSTRACT

An online concierge system generates suggested instructions for presentation to a user. The online concierge system access instruction examples corresponding to a target item category and generates candidate instruction representations based on instruction messages within each instruction example. The online concierge system generates preliminary scores for the candidate instruction representations that are directly related to an intra-category frequency of use of the instruction tokens of the candidate instruction representation within the target item category. The online system normalizes these preliminary scores for the candidate instruction representations based on the inter-category frequency of use of the instruction tokens in all item categories to generate final scores for the candidate instruction representations. The online concierge system selects a set of instruction representations based on these final scores and generates suggested instructions based on the set of instruction representations.

20 Claims, 5 Drawing Sheets

(51) Int. Cl.
*G06F 40/284* (2020.01)
*G06Q 30/0601* (2023.01)

(52) U.S. Cl.
CPC ..... *G06Q 30/0621* (2013.01); *G06Q 30/0601* (2013.01); *G06Q 30/0631* (2013.01)

(58) Field of Classification Search
CPC .......... G06Q 30/0613; G06Q 30/0631; G06Q 30/0641; G06Q 30/015; G06F 40/10; G06F 40/284; G06F 40/279; G06F 40/20
See application file for complete search history.

(56) References Cited

U.S. PATENT DOCUMENTS

| | | | |
|---|---|---|---|
| 2013/0024329 A1* | 1/2013 | Chang | G06Q 30/02 705/27.1 |
| 2014/0095285 A1 | 4/2014 | Wadell et al. | |
| 2015/0379610 A1* | 12/2015 | Stankiewicz | G06F 16/24578 705/26.7 |
| 2018/0134492 A1 | 5/2018 | Lert | |
| 2018/0204113 A1* | 7/2018 | Galron | G06Q 30/0631 |
| 2020/0219171 A1* | 7/2020 | Zhuang | G06Q 30/0635 |
| 2021/0056571 A1* | 2/2021 | Su | G06Q 30/0201 |
| 2021/0264059 A1* | 8/2021 | Ivanov | G06F 21/554 |
| 2022/0237679 A1 | 7/2022 | Tenneti et al. | |

\* cited by examiner

GENERATING SUGGESTED INSTRUCTIONS THROUGH NATURAL LANGUAGE PROCESSING OF INSTRUCTION EXAMPLES

BACKGROUND

An online concierge system coordinates the delivery of items to users. A user can order items for collection by a picker, and may include instructions for how a picker should collect an item. For example, when ordering a banana through the online concierge system, a user may include an instruction with the ordered banana asking the picker to collect a less ripe banana or a banana of a particular size.

An online concierge system may improve the convenience of including instructions with an object by providing suggested instructions to a user. A user can select these suggested instructions in an ordering interface to automatically include the suggested instruction with the ordered item. However, conventional methods and techniques for generating suggested text may be insufficient for online concierge systems that have many items that a user can order. For example, a system could use humans to generate suggested instructions for each item offered on an online concierge system, but this approach can be incredibly expensive and time consuming for even a small number of items.

Natural language processing (NLP) techniques may be used to generate suggested instructions based on example free text instructions provided by users. However, conventional NLP techniques are ineffective at generating suggested instructions for items offered by an online concierge system. For example, these conventional techniques may be over-generic across different types of items, meaning they provide the same suggested instructions for each item category. Accordingly, the suggested instructions generated by these techniques tend not to generate instructions that may be unique to different types of items because those instructions are not used across all types of items.

Therefore, conventional NLP techniques fail to generate effective suggested instructions for an online concierge system.

SUMMARY

In accordance with one or more aspects of the disclosure, an online concierge system generates instruction suggestions for presentation to a user. To generate instruction suggestions for items in a target item category, the online concierge system accesses a set of instruction examples that are stored by the online concierge system. Each instruction example represents an instance of a user including an instruction message with an item from the target item category. The online concierge system generates candidate instruction representations for each of the instruction examples based on the instruction message of each instruction example. The candidate instruction representations are sets of instruction tokens that together represent a set of words for a suggested message to be generated based on the candidate instruction representation. In some embodiments, the candidate instruction representations are n-grams of different lengths of the instruction messages from the instruction examples.

The online concierge system scores each of the candidate instruction representation. The online concierge system generates a preliminary score for the candidate instruction representation that is based on the intra-category frequency of use of its instruction tokens. The intra-category frequency of use of the instruction tokens for a candidate instruction representation represents how often the words corresponding to the instruction tokens are used in instruction messages for items in the category. If the instruction tokens for a candidate instruction representation have a high intra-category frequency of use, then that means that the instruction tokens correspond to words are commonly used in instruction messages for items in the target item category, and thus the instruction tokens are likely to correspond to a helpful suggested instruction. Accordingly, the online concierge system generates the preliminary score for a candidate instruction representation such that the preliminary score is directly related to the intra-category frequency of use of the instruction tokens for the candidate instruction representation.

The online concierge system normalizes the preliminary score for each of the candidate instruction representations to generate a final score for each candidate instruction representation. The online concierge system normalizes the preliminary score based on the inter-category frequency of use of its instruction tokens. The inter-category frequency of use for a candidate instruction representation represents how often the words corresponding to the instruction tokens are used in instruction messages for items in multiple item categories. If the instruction tokens for a candidate instruction representation have a high inter-category frequency of use, then that means that the instruction tokens correspond to words that are commonly used in instruction messages for items outside of the target item category. Thus, the instruction tokens likely correspond to an instruction that is less exclusive to items in the target item category, which means that the corresponding candidate instruction representation is less likely to be specifically useful for items in the item category. Accordingly, the online concierge system generates a final score that is inversely related to the inter-category frequency of use of the instruction tokens of the candidate instruction representation.

The online concierge system selects a set of instruction representations for the target item category based on the generated final scores, and generates suggested instructions based on the selected instruction representations. The online concierge system may perform this process for each item category of a set of item categories to generate suggested instructions for each of the item categories.

The online concierge system presents the suggested instructions to a customer through an ordering interface. The online concierge system receives a request from a customer to add an item to the customer's shopping list and identifies an item category corresponding to the added item. The online concierge system transmits the suggested instructions for the identified item category to the customer's client device. If the customer selects a suggested instruction, the online concierge system adds an instruction message corresponding to the selected suggested instruction to the ordered item.

By scoring candidate instruction representations in a direct relationship with the intra-category frequency of use of their instruction tokens, the online concierge system identifies instruction representations that correspond to words that are commonly used in instruction messages for items in the corresponding item category. However, by also normalizing the preliminary score in an inverse relationship to the inter-category frequency of use, the online concierge system ranks more-highly those instruction representations that represent instructions that are specifically relevant to items in the item category, rather than those that may be more broadly applicable. Thus, the online concierge system improves on conventional NLP techniques in the generation of suggested instructions for an item.

DETAILED DESCRIPTION

Figure 1:
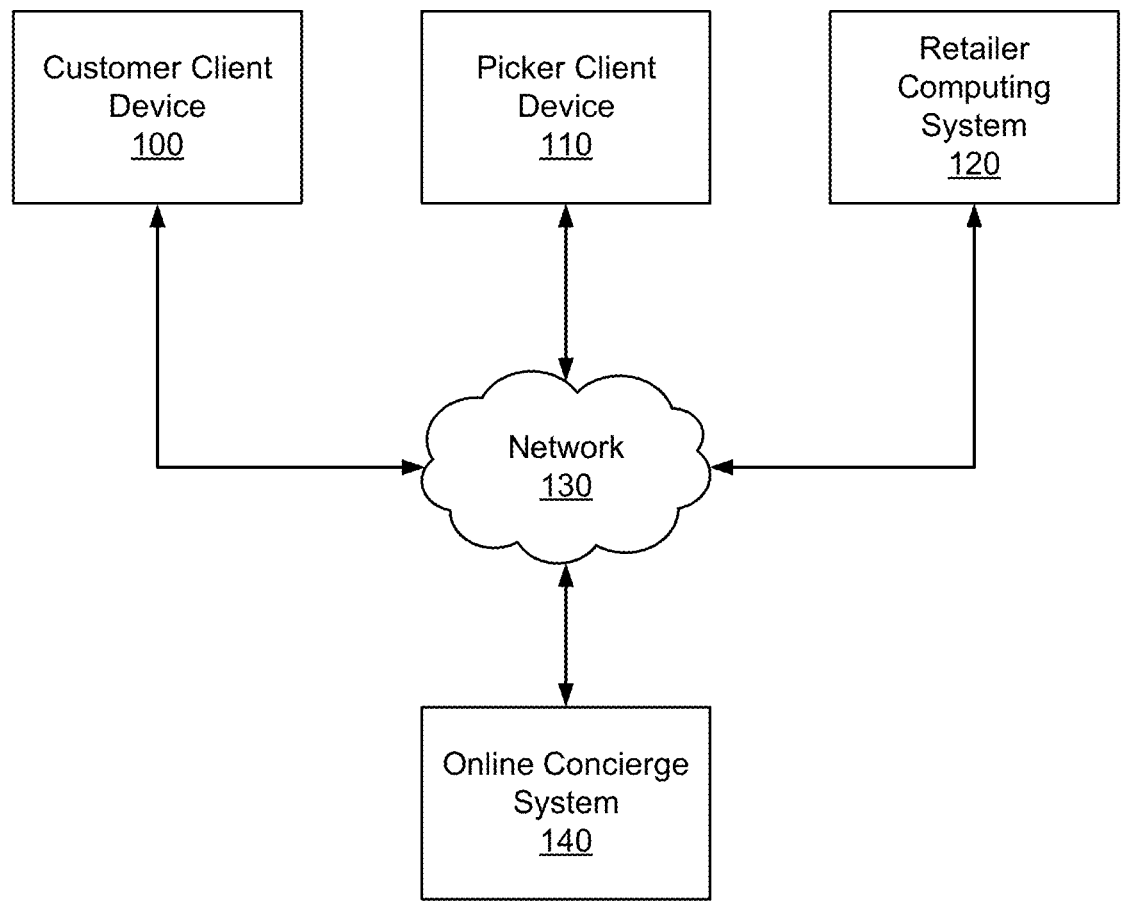
FIG. 1 illustrates an example system environment for an online concierge system, in accordance with one or more illustrative embodiments.

Figure (FIG. 1 illustrates an example system environment for an online concierge system 140, in accordance with some embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

In some embodiments, the ordering interface includes a user interface for adding an instruction message to be included with an item that the customer is ordering. Some customers have particular instructions to pickers on how to select items for their order. For example, a customer ordering a banana may instruct a picker to collect bananas that are less ripe so that the bananas last longer, or more ripe so that they can be consumed immediately. The ordering interface allows a customer to input an instruction message to include with an item in their order. The ordering interface may provide a text box through which the customer can type in their order. Additionally, the ordering interface may provide suggested instructions for a customer to automatically add an instruction message. The customer can select an element presenting a suggested instruction to include the instruction message with an item.

Figure 4:
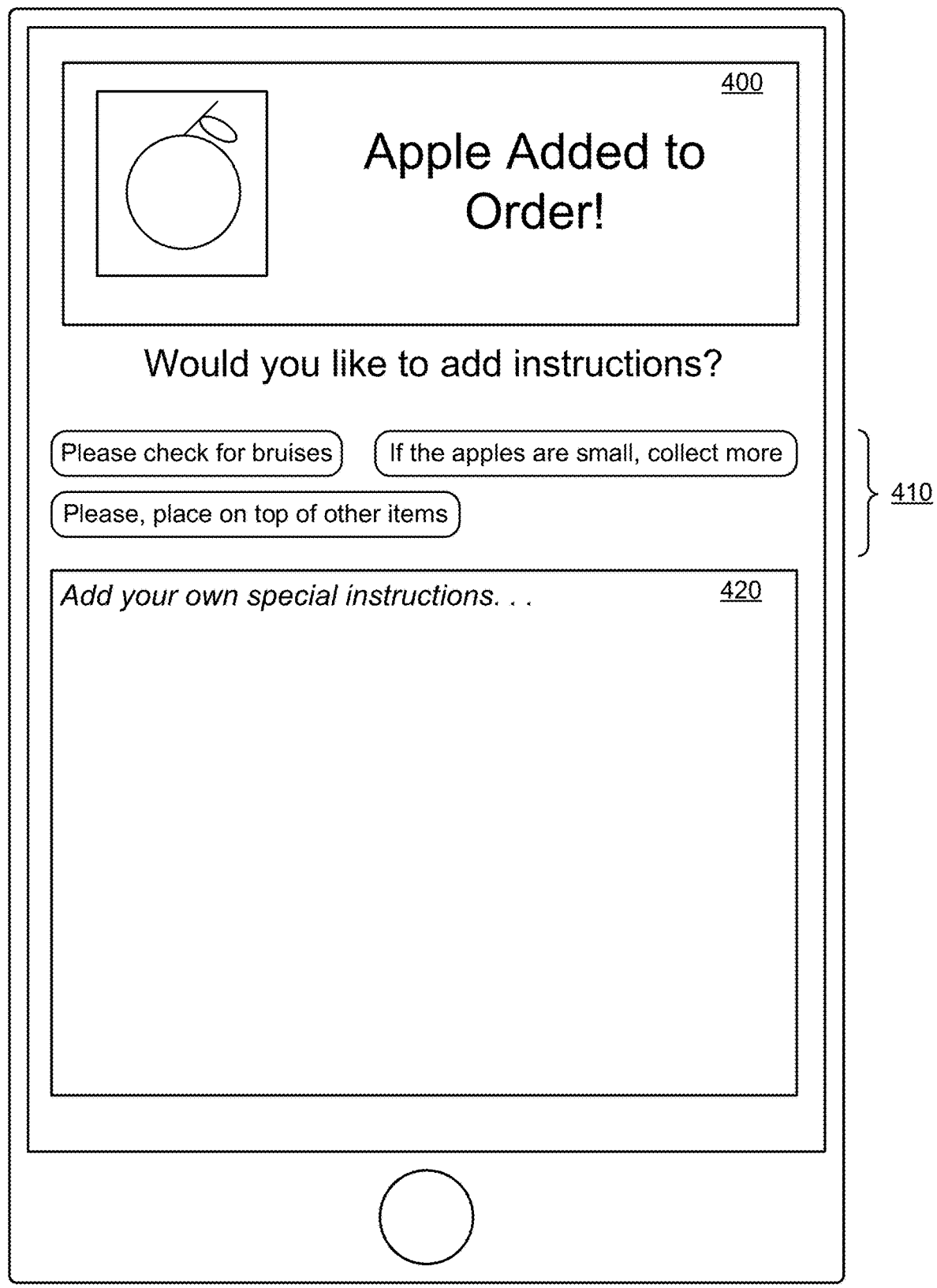
FIG. 4 illustrates an example ordering interface through which a customer can add an instruction message with an item, in accordance with one or more illustrative embodiments.

FIG. 4 illustrates an example ordering interface through which a customer can add an instruction message with an item, in accordance with some embodiments. The ordering interface includes an element 400 that displays and describes the item added to the customer's shopping list. Additionally, the ordering interface includes suggested instruction elements 410. A customer can select a suggested instruction element 410 to add the described suggested instructions to their ordered item. Alternatively, the customer can use the custom instruction element 420 to input free text describing an instruction they would like to include with the item. The generation and selection of suggested instructions is described in further detail below.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker device 100 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the deliver location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In some embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provide item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140.

Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from customer client devices 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
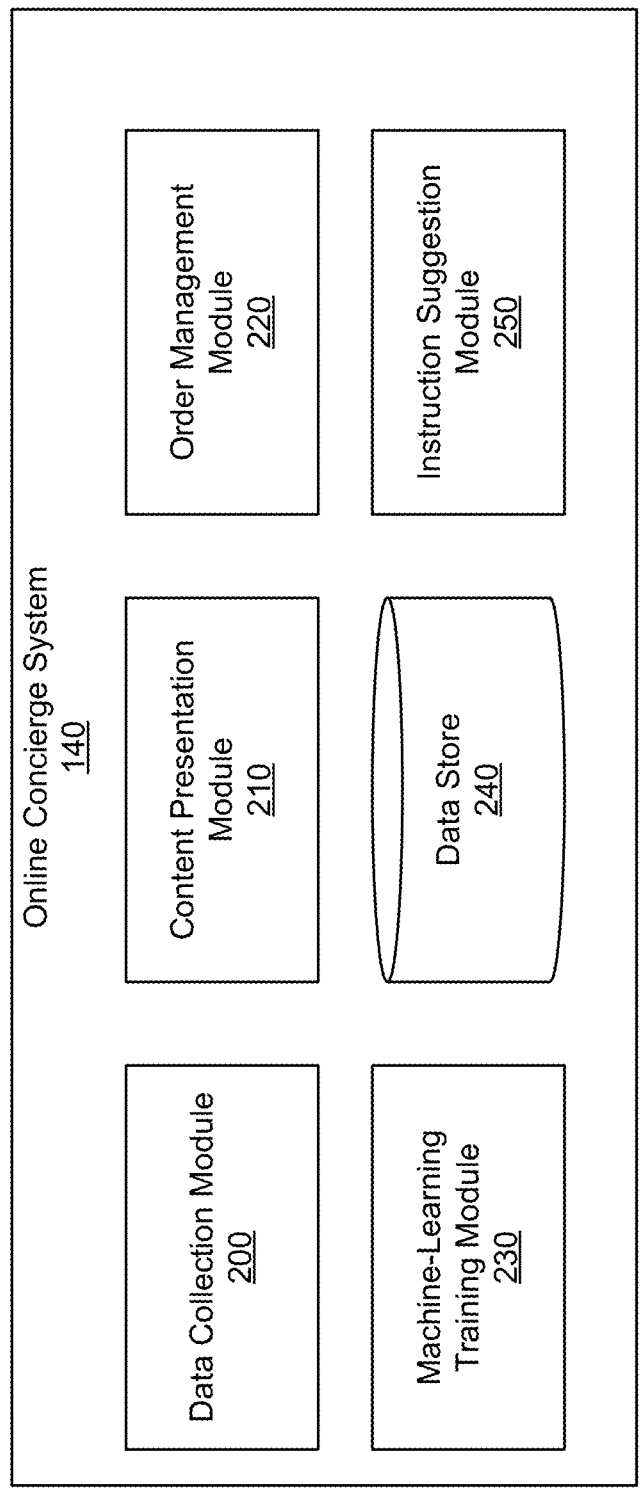
FIG. 2 illustrates an example system architecture for an online concierge system, in accordance with one or more illustrative embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

Item data for an item may indicate an item category to which the item belongs. An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from customer client devices 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers.

Each machine-learning model includes a set of parameters. A set of parameters for a machine-learning model are parameters that the machine-learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example.

The machine-learning training module 230 may apply an iterative process to train a machine-learning model whereby the machine-learning training module 230 trains the machine-learning model on each of the set of training examples. To train a machine-learning model based on a training example, the machine-learning training module 230 applies the machine-learning model to the input data in the training example to generate an output. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. Additionally, the data store 240 stores training examples that may be used to train machine-learning models. The data store 240 uses computer-readable media to store data, and may use databases to organize the stored data.

The instruction suggestion module 250 generates suggested instructions for items in a target item category. The instruction suggestion module 250 uses instruction examples stored by the data store 240 to generate suggested instructions for item categories. Each item category is associated with a generated set of suggested instructions. When the online concierge system 140 receives a request from a customer client device 100 to add an item to an order, the instruction suggestion module 250 identifies the item category that corresponds to the item that the customer wants to add. The instruction suggestion module 250 identifies the set of suggested instructions that corresponds to the identified item category and transmits those suggested instructions to the customer client device 100.

Figure 3:
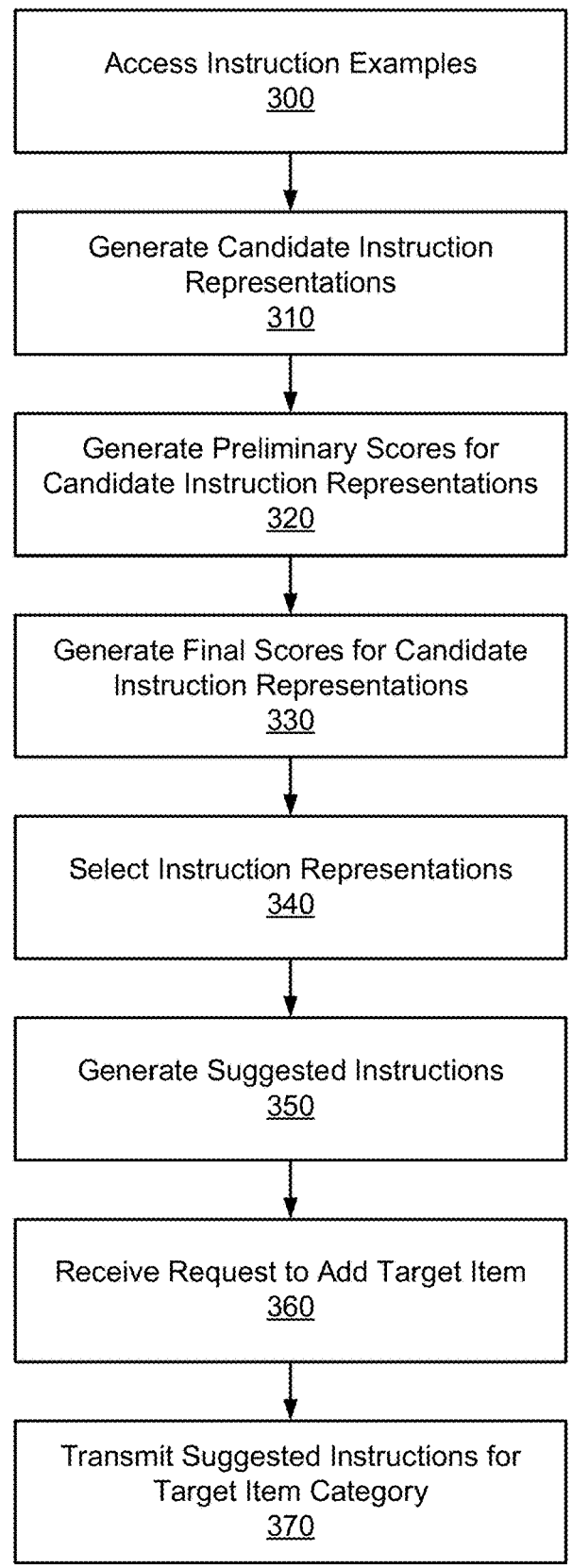
FIG. 3 is a flowchart for a method of generating and presenting suggested instructions for items in a target item category, in accordance with one or more illustrative embodiments.

FIG. 3 is a flowchart for a method of generating and presenting suggested instructions for items in a target item category, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system accesses 300 a set of instruction examples. An instruction example stores data corresponding to an instance where a customer provided an instruction message to a picker with an order. For example, each instruction example stores the instruction message provided by the customer. The instruction message is free text input by the customer that represents the customer's instructions on how a picker should collect an item that the customer ordered. In some embodiments, each instruction example includes an item identifier for the ordered item that is associated with the instruction message.

The accessed set of instruction examples correspond to a target item category. The target item category is the item category for which the online concierge system is generating suggested instructions. As described above, an item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The online concierge system generates 310 candidate instruction representations based on the set of instruction examples. A candidate instruction representation is a set of instruction tokens that together represent a set of words for a suggested instruction. Each instruction token is a word from an instruction message of one of the instruction examples. For example, the candidate instruction representations may be n-grams of the instruction messages of the instruction examples. The candidate instruction representations may include n-grams of different lengths (e.g., n-grams of length one, two, and three).

In some embodiments, the online concierge system generates the candidate instruction representations based on pre-processed instruction examples. For example, the online concierge system may pre-process the instruction messages in the instruction examples to stop words, such as prepositions, articles, pronouns, or conjunctions. Similarly, the online concierge system may convert words to more simple forms, such as converting verbs to their infinitive form. Additionally, the online concierge system may filter out certain words that are included in the instruction message for politeness (e.g., "please" and "thank you") but that do not convey the substance of the instruction.

Figure 5:
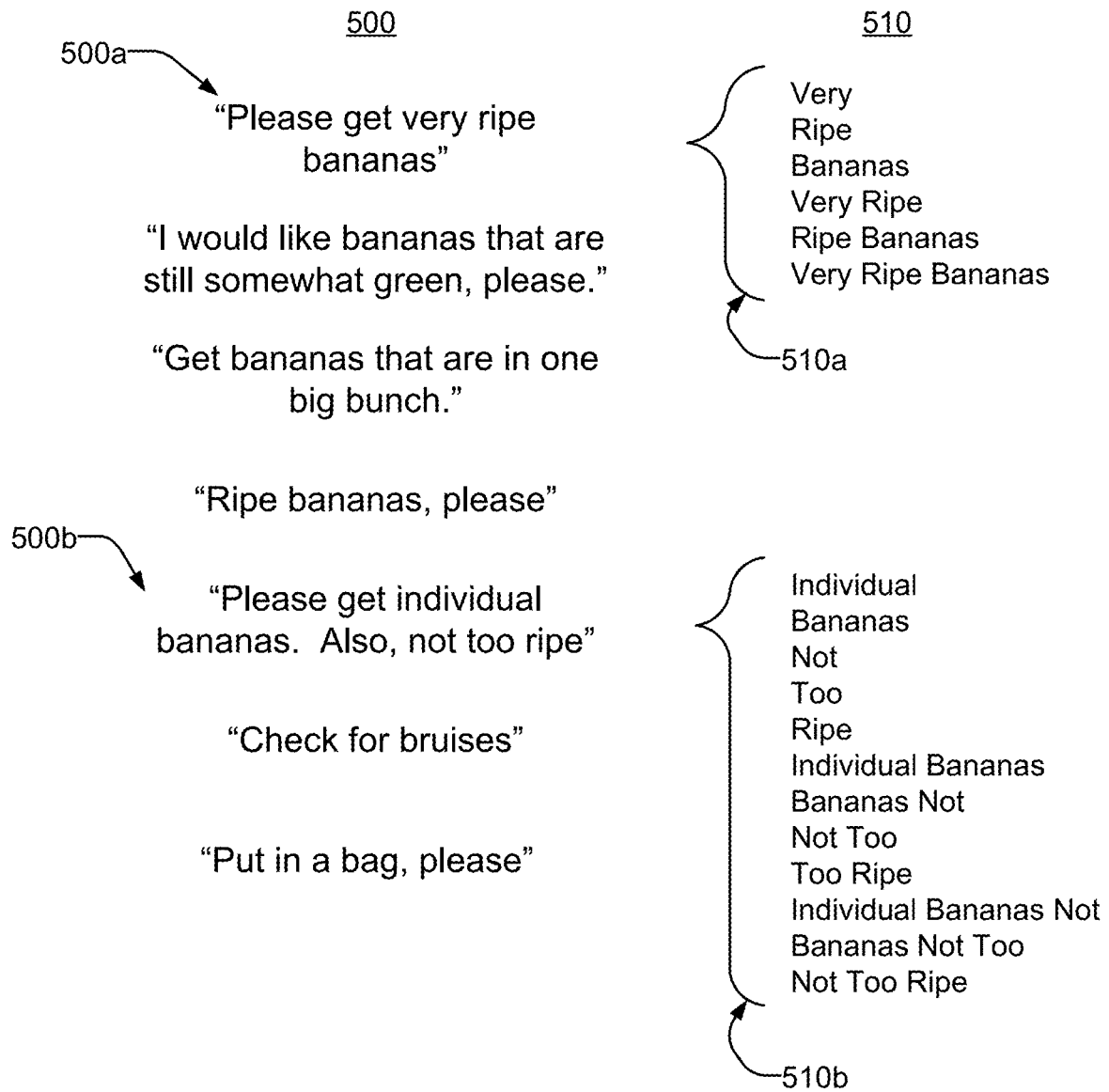
FIG. 5 illustrates example instruction message and candidate instruction representations generated based on those instruction messages, in accordance with one or more embodiments.

FIG. 5 illustrates example instruction message and candidate instruction representations generated based on those instruction messages, in accordance with some embodiments. The first column depicts example instruction messages 500 that customers have included with an order for bananas, and the second column depicts some candidate instruction representations 510 that may be generated based on some of the instruction messages 500 from the first column. For example, candidate instruction representations 510a are generated based on instruction message 500a and candidate instruction representations 510b are generated based on instruction message 500b. In the illustrated embodiment, the candidate instruction representations 510 are n-grams of length one, two, and three, and are generated based on pre-processed versions of their respective instruction messages 500.

The online concierge system generates 320 a preliminary score for each candidate instruction representation. The preliminary score is for a candidate instruction representation is generated based on an intra-category frequency of use of the candidate instruction representation. The intra-category frequency of use of a candidate instruction representation represents the usage of the one or more instruction tokens of the candidate instruction representation among the instruction messages of the accessed set of instruction examples. For example, the intra-category frequency of use may be represented as a proportion, a percentage, or as a ratio. To determine the intra-category frequency of use of a candidate instruction representation, the online concierge system may determine how many of the instruction messages use words corresponding to the one or more instruction tokens of a candidate instruction representation, and may compare that count to the total number of instruction messages in the set of instruction examples to determine the frequency of use of the instruction tokens in the instruction examples. In some embodiments, the frequency of use for a candidate instruction representation is generated based on whether all of the one or more instruction tokens associated with the candidate instruction representation are present in instruction messages. Alternatively, the frequency of use for a candidate instruction representation is generated based on whether any of the one or more instruction tokens associated with the candidate instruction representation are present in instruction messages.

The online concierge system generates 330 final scores for each of the candidate instruction representations based on the preliminary scores for the candidate instruction representations. The online concierge system generates final scores for candidate instruction representations by normalizing the preliminary scores based on the inter-category frequency of use of the candidate instruction representation. The inter-category frequency of use for a candidate instruction representation of a target item category represents the usage of the one or more instruction tokens among instruction messages for a set of item categories, not just for the target item category. For example, to compute the inter-category frequency of use for a candidate instruction representation, the online concierge system compares its instruction tokens to instruction messages from instruction examples corresponding to multiple item categories to determine how often words corresponding to any or all of the instruction tokens are used in each of the instruction messages. The online concierge system computes the frequency of use of the instruction tokens for the candidate instruction representation based on the number of instruction messages that use any or all of the instruction tokens and based on the total number of instruction messages considered. The frequency of use may be represented as a proportion, a percentage, or as a ratio.

The online concierge system generates the final score for a candidate instruction representation by normalizing the preliminary score based on the inter-category frequency of use for the candidate instruction representation. The online concierge system normalizes the preliminary score such that final score is inversely related to the inter-category frequency of use of the candidate instruction representation and is directly related to the intra-category frequency of use of the candidate instruction representation. Accordingly, the online concierge system generates final scores for candidate instruction representations such that candidate instruction representations are scored more highly for having instruction tokens that are commonly used within the target item category and that are not commonly used within other item categories.

The online concierge system selects 340 a set of instruction representations for the target item category based on the final scores of the candidate instruction representations. The online concierge system may select the set of instruction representations by ranking the set of candidate instruction representations based on the final scores and selecting the candidate instruction representations that exceed some threshold ranking or percentile. Alternatively, the online concierge system may select the set of instruction representations based on which instruction representations have final scores that exceed a threshold value.

The online concierge system generates 350 suggested instructions for the target item category based on the selected set of instruction representations. The suggested instructions are generated text that represents instructions that a customer may include with an item. The online concierge system may use an instruction generation model to generate the suggested instructions based on the selected set of instruction representations. The instruction generation model is a machine-learning model that is trained to generate suggested instructions based on instruction representations. Alternatively, the online concierge system may transmit the set of instruction recommendations to a human operator for the human operator to generate the text for the suggested instructions.

While the steps above are described in the context of a single target item category, the online concierge system performs a similar process to generate suggested instructions for each item category in a set of item categories used by the online concierge system. The online concierge system sorts instruction examples into sets based on which item category their ordered items correspond to. The online concierge system uses steps described above to generate suggested instruction for each item category.

The online concierge system presents the suggested instructions for an item category to the customer for the customer to include with an item that the customer is ordering. The online concierge system receives 360 a request from a customer to add an item to a shopping list. The online concierge system may identify the item category for the added item and identify the set of suggested instructions corresponding to the identified item category. The online concierge system transmits 370 the identifies set of suggested instructions to the customer client device corresponding to the customer.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
   at a computer system comprising at least one processor and at least one non-transitory computer-readable medium:
   accessing a set of instruction examples corresponding to a target item category, wherein each instruction example comprises an instruction message provided by a customer in association with an item ordered by the customer, and wherein the instruction message comprises free text from the customer to a picker relating to collecting the item, and wherein the item is associated with the target item category;
   generating a set of candidate instruction representations by applying natural-language processing to the instruction messages of the set of instruction examples, wherein each candidate instruction representation comprises one or more instruction tokens that represent one or more words for a suggested instruction based on the candidate instruction representation;
   generating a preliminary score for each candidate instruction representation in the set of candidate instruction representation based on an intra-category frequency of use of the one or more instruction tokens of the candidate instruction representation among the set of instruction examples;
   generating a final score for each candidate instruction representation in the set of candidate instruction representations by normalizing the preliminary score for each candidate instruction representation based on an inter-category frequency of use of the one or more instruction tokens of the candidate instruction representation among another set of instruction examples corresponding to a plurality of item categories, wherein the plurality of item categories comprises the target item category;
   selecting a set of instruction representations for the target item category based on the final scores for the set of candidate instruction representations;
   generating a set of suggested instructions for the item category based on the selected set of instruction representations;
   receiving a request from a client device to add a target item to an order for a customer associated with the client device, wherein the target item is associated with a target item category of the set of item categories; and
   transmitting the set of suggested instructions associated with the target item category to the client device for display to the customer.

2. The method of claim 1, wherein each instruction example in the set of instruction examples comprises an item identifier corresponding to the item ordered by the customer.

3. The method of claim 2, wherein accessing the set of instruction examples comprises:
   identifying the set of instruction examples from the other set of instruction examples based on the target item category and the item identifier of each instruction example of the other set of instruction examples.

4. The method of claim 1, wherein generating the set of candidate instruction representations comprises:
   generating n-grams based on the instruction messages of the set of instruction examples.

5. The method of claim 1, wherein selecting the set of instruction representations comprises:
   ranking the set of candidate instruction representations based on the generated final scores; and
   determining which instruction representations of the set of candidate instruction representations exceed a threshold.

6. The method of claim 5, wherein determining which instruction representations exceed a threshold comprises:
   identifying which of the set of candidate instruction representations are ranked above a threshold ranking.

7. The method of claim 5, wherein determining which instruction representations exceed a threshold comprises:
   identifying which of the set of candidate instruction representations are ranked within a threshold percentile.

8. The method of claim 1, wherein generating the set of suggested instructions comprises:
   applying a machine-learning model to each instruction representation of the selected set of instruction representations, wherein the machine-learning model is trained to generate suggested instructions based on instruction representations.

9. The method of claim 1, wherein generating the set of suggested instructions comprises:
   transmitting the selected set of instruction representations to a human operator.

10. The method of claim 1, further comprising:
    responsive to receiving the request from the client device, identifying the target item category as an item category corresponding to the target item.

11. A non-transitory computer-readable medium storing instructions that, when executed by a processor, cause the processor to:
    access a set of instruction examples corresponding to a target item category, wherein each instruction example comprises an instruction message provided by a customer in association with an item ordered by the customer, and wherein the instruction message comprises free text from the customer to a picker relating to collecting the item, and wherein the item is associated with the target item category;
    generate a set of candidate instruction representations by applying natural-language processing to the instruction messages of the set of instruction examples, wherein each candidate instruction representation comprises one or more instruction tokens that represent one or more words for a suggested instruction based on the candidate instruction representation;
    generate a preliminary score for each candidate instruction representation in the set of candidate instruction representation based on an intra-category frequency of use of the one or more instruction tokens of the candidate instruction representation among the set of instruction examples;
    generate a final score for each candidate instruction representation in the set of candidate instruction representations by normalizing the preliminary score for each candidate instruction representation based on an inter-category frequency of use of the one or more instruction tokens of the candidate instruction representation among another set of instruction examples corresponding to a plurality of item categories, wherein the plurality of item categories comprises the target item category;

select a set of instruction representations for the target item category based on the final scores for the set of candidate instruction representations;

generate a set of suggested instructions for the item category based on the selected set of instruction representations;

receive a request from a client device to add a target item to an order for a customer associated with the client device, wherein the target item is associated with a target item category of the set of item categories; and transmit the set of suggested instructions associated with the target item category to the client device for display to the customer.

12. The computer-readable medium of claim 11, wherein each instruction example in the set of instruction examples comprises an item identifier corresponding to the item ordered by the customer.

13. The computer-readable medium of claim 12, wherein accessing the set of instruction examples comprises:

identifying the set of instruction examples from the other set of instruction examples based on the target item category and the item identifier of each instruction example of the other set of instruction examples.

14. The computer-readable medium of claim 11, wherein generating the set of candidate instruction representations comprises:

generating n-grams based on the instruction messages of the set of instruction examples.

15. The computer-readable medium of claim 11, wherein selecting the set of instruction representations comprises:

ranking the set of candidate instruction representations based on the generated final scores; and determining which instruction representations of the set of candidate instruction representations exceed a threshold.

16. The computer-readable medium of claim 15, wherein determining which instruction representations exceed a threshold comprises:

identifying which of the set of candidate instruction representations are ranked above a threshold ranking.

17. The computer-readable medium of claim 15, wherein determining which instruction representations exceed a threshold comprises:

identifying which of the set of candidate instruction representations are ranked within a threshold percentile.

18. The computer-readable medium of claim 11, wherein generating the set of suggested instructions comprises:

applying a machine-learning model to each instruction representation of the selected set of instruction representations, wherein the machine-learning model is trained to generate suggested instructions based on instruction representations.

19. The computer-readable medium of claim 11, wherein generating the set of suggested instructions comprises:

transmitting the selected set of instruction representations to a human operator.

20. A system comprising:

a processor; and a non-transitory computer-readable medium storing instructions that, when executed by a processor, cause the processor to:

access a set of instruction examples corresponding to a target item category, wherein each instruction example comprises an instruction message provided by a customer in association with an item ordered by the customer, and wherein the instruction message comprises free text from the customer to a picker relating to collecting the item, and wherein the item is associated with the target item category;

generate a set of candidate instruction representations by applying natural-language processing to the instruction messages of the set of instruction examples, wherein each candidate instruction representation comprises one or more instruction tokens that represent one or more words for a suggested instruction based on the candidate instruction representation;

generate a preliminary score for each candidate instruction representation in the set of candidate instruction representation based on an intra-category frequency of use of the one or more instruction tokens of the candidate instruction representation among the set of instruction examples;

generate a final score for each candidate instruction representation in the set of candidate instruction representations by normalizing the preliminary score for each candidate instruction representation based on an inter-category frequency of use of the one or more instruction tokens of the candidate instruction representation among another set of instruction examples corresponding to a plurality of item categories, wherein the plurality of item categories comprises the target item category;

select a set of instruction representations for the target item category based on the final scores for the set of candidate instruction representations;

generate a set of suggested instructions for the item category based on the selected set of instruction representations;

receive a request from a client device to add a target item to an order for a customer associated with the client device, wherein the target item is associated with a target item category of the set of item categories; and transmit the set of suggested instructions associated with the target item category to the client device for display to the customer.

* * * * *